United States Patent Office 3,312,044
Patented Apr. 4, 1967

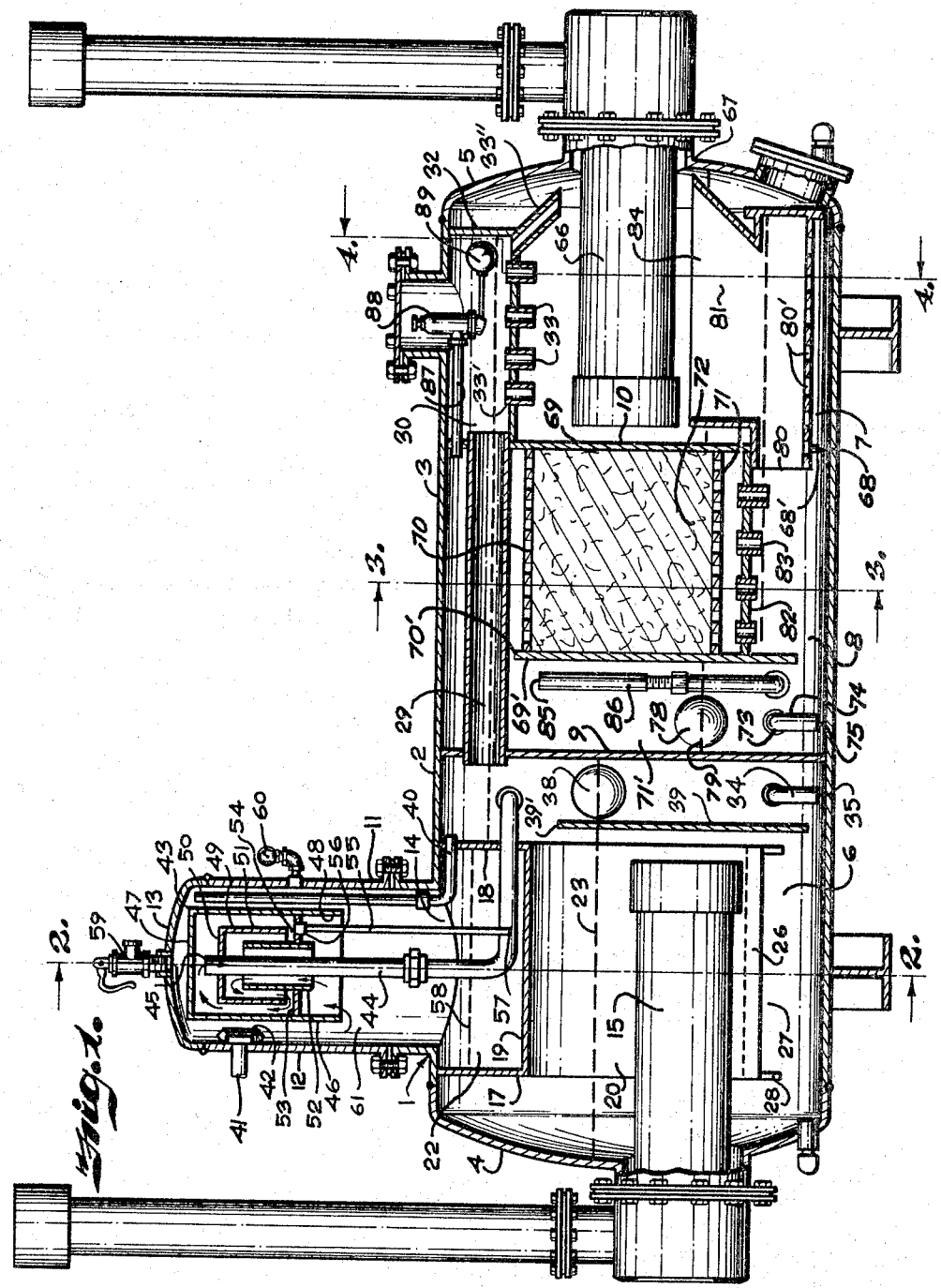

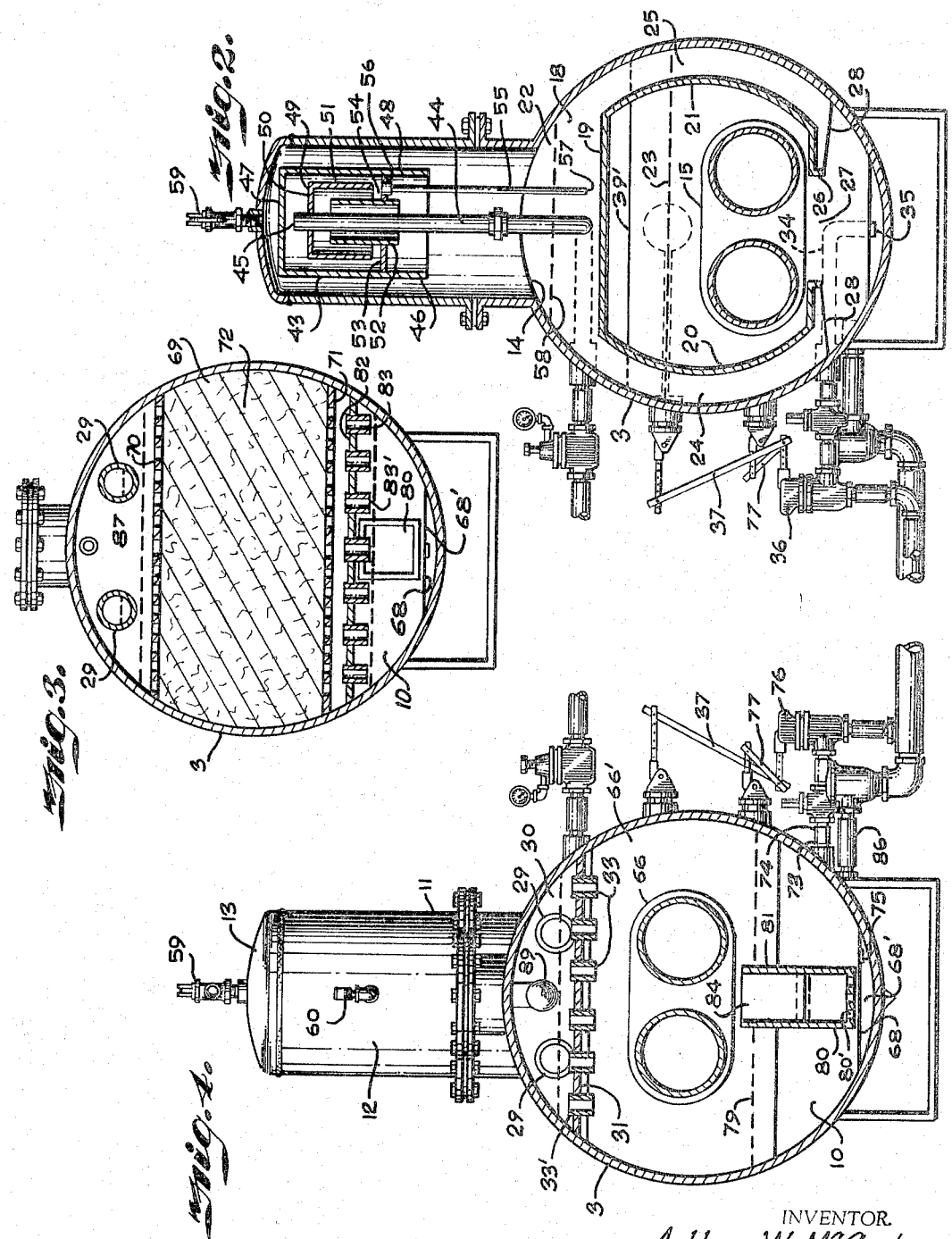

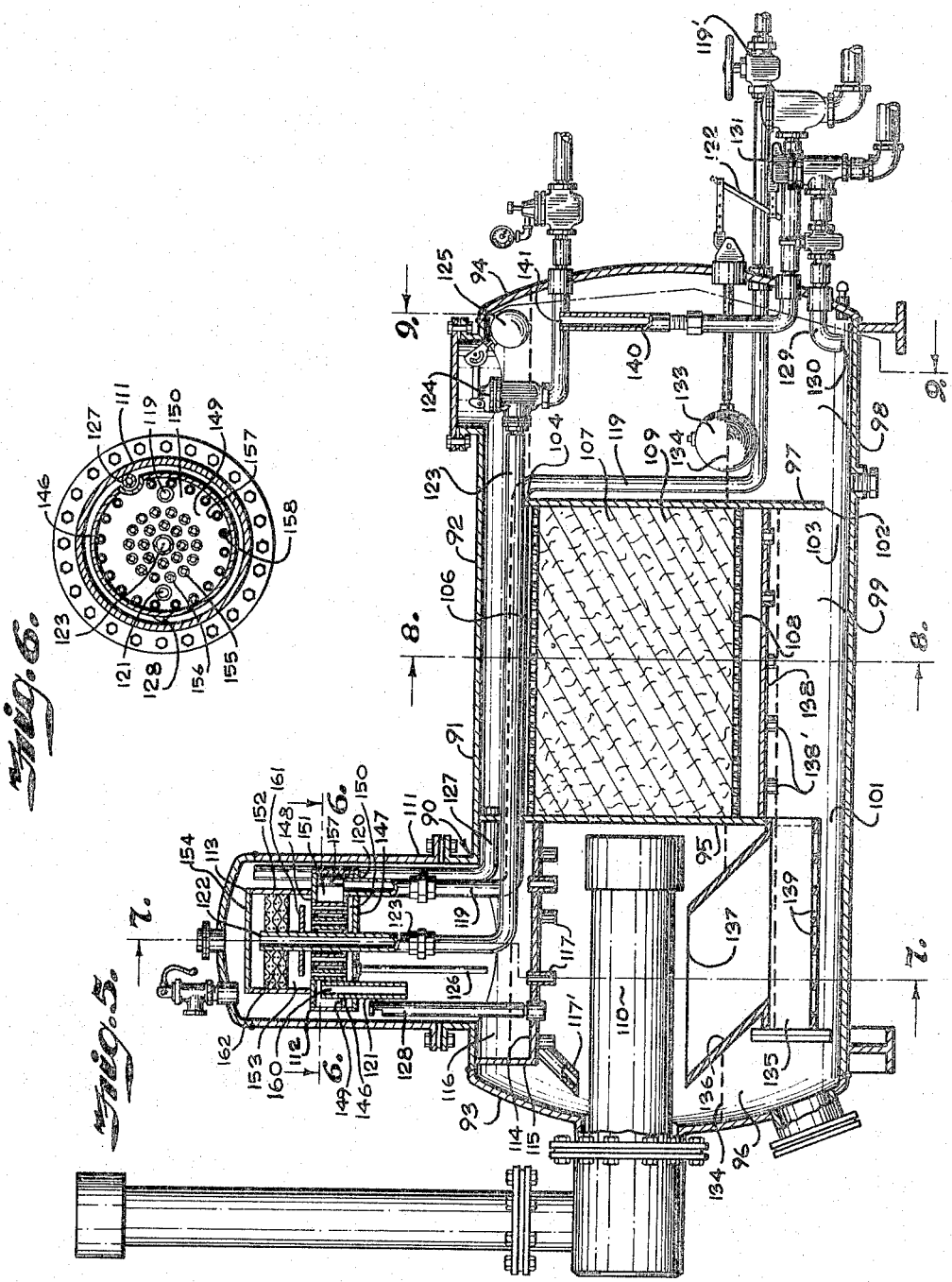

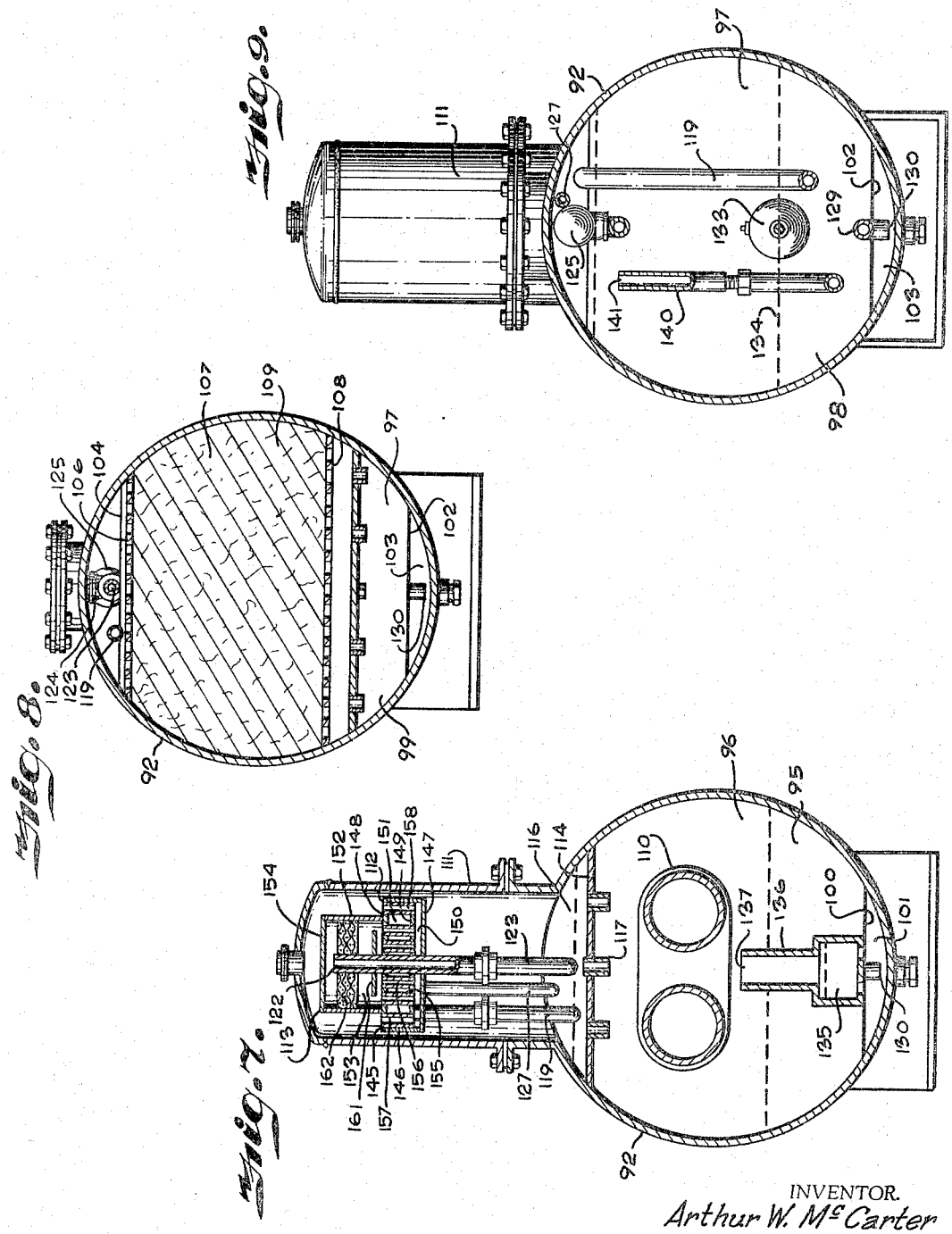

3,312,044
MEANS FOR TREATING OIL WELL PRODUCTION
Arthur W. McCarter, Great Bend, Kans., assignor to O'Neill Tank Company, Inc., Great Bend, Kans., a corporation of Kansas
Filed Mar. 23, 1964, Ser. No. 353,885
5 Claims. (Cl. 55—168)

This invention relates to new and useful improvements in means for treating oil well emulsion streams, and is particularly concerned with processing oil well production in the field in order to separate the production into oil, water and gas.

The invention is directed primarily to the heater type of emulsion treater preferably of the horizontal type for large capacity. One of the problems in such treaters is to provide sufficient heat to give the required separation, and it is economically desirable to consume and waste as little heat as possible in the water of the well stream. Also, another problem is to prevent loss of lighter hydrocarbons into gas when they are recoverable or liquefiable at ambient conditions. Another problem presented in such treating is that the production is a mixture of fluids which have a natural tendency to separate from each other in vertical directions yet the fluids must be moved horizontally while still using their natural tendency to vertically separate.

A principal object of the present invention is to flow a well stream or production into a treater and release of the well stream for flow downwardly over a heat source for facilitating separation of the production into oil, water and gas. Another object is to bring fractions of all gaseous hydrocarbons released from the well stream and evolved in the heating step in heat exchange relation with the oil well production or well stream to condense the fractions which can be held as a liquid at ambient conditions and return the condensate to the liquid fractions.

Further objects of the present invention are to distribute well stream liquids effectively in a heated zone for flow downwardly over a heat source with resulting stratification of oil and emulsion and free water for a minimum of absorption of heat by the water; to provide a horizontal treating vessel with a coalescing section adjacent to a heating zone for indirect heating of the coalescing section; to provide for removal and flow of oil and emulsion from a stratus thereof in the heating zone, flow thereof to below a coalescing section and effective distribution therein for effecting coalescing of its oil and water while flowing upwardly in the coalescing section; to provide for the heating of a well stream in one vessel compartment with partial separation therein, removing of liquids of the production from an upper stratus in said one vessel compartment to a second vessel compartment for further heating with the coalescence occurring in a third vessel compartment with the liquids in the upper stratus in the second compartment being moved to the third compartment for vertically upward flow therein; to provide for indirect heating of the third or coalescing compartment by having same positioned between the first and second compartments.

The invention further contemplates flowing the oil well production into a separator section, removal of the gas fraction, delivery of the liquid portions to the heating chamber of a treater vessel in which sufficient residence time is provided to permit stratification of the oil and emulsion in a stratus and free water in a separate stratus with the heat source subtantially in the oil and emulsion stratus for efficient use of the heat.

Other objects and advantages of this invention will become apparent from the following description taken in connection with the accompanying drawings wherein are set forth by way of illustration and example certain embodiments of this invention.

FIG. 1 is a diagrammatic sectioned side elevation of a treater embodying the features of the present invention.
FIG. 2 is a vertical transverse sectional view through the treater taken on the line 2—2, FIG. 1.
FIG. 3 is a vertical transverse sectional view taken through the treater on the line 3—3, FIG. 1.
FIG. 4 is a transverse sectional view through the treater taken on the line 4—4, FIG. 1.
FIG. 5 is a diagrammatic sectioned side elevation of a modified form of treater.
FIG. 6 is a horizontal sectional view through the gas separator and condenser taken on the line 6—6, FIG. 5.
FIG. 7 is a transverse sectional view through said modified form of treater taken on the line 7—7, FIG. 5.
FIG. 8 is a transverse sectional view through said modified form of treater taken on the line 8—8, FIG. 5.
FIG. 9 is a transverse sectional view through the modified form of treater taken on the line 9—9, FIG. 5.

Referring more in detail to the drawings:

The reference numeral 1 generally designates an oil well production treater which includes an elongated tank or vessel 2 extending horizontally and preferably having a cylindrical wall or shell 3 with its ends closed by domed heads 4 and 5 respectively. The treater illustrated in FIGS. 1 to 4 inclusive is arranged with three compartments with the first compartment 6 in the end portion adjacent the head 4, a second compartment 7 in an end portion adjacent the head 5, and a third compartment 8 formed within said shell 3 by longitudinally spaced vertical transverse partitions 9 and 10 that separate the third compartment from the first compartment and the second compartment respectively. The treater includes a separator section 11 which, in the illustrated structure, is a vertically extending shell 12 closed at its upper end by a domed head 13 with its lower end connected to the horizontal vessel and open thereto as at 14 for communication with the interior thereof, the separator being positioned over the first compartment 6. Obviously the compartments could be formed in separate vessels but such an arrangement would require extra closures with no particular advantages.

Heat to raise the temperature of the production is supplied by a heat source, for example a large fire tube 15, that extends through a connection 16 in the end head 4 and longitudinally into the first compartment 6. In the illustrated structure, the fire tube 15 is of a return bend type of large capacity for heating the large volume of fluids passing through the compartment 6. It is of conventional design, being fired with gas or oil, and controlled from standard thermometer elements inserted into the heated liquids. The details of the control system and fuel supply of these tubes are not shown. The fire tube 15 representing the heat source in the compartment 6 usually will be referred to simply as the heat source; however, in the structure illustrated, the fire tube is principally positioned in the water stratus for movement of the oil and emulsion thereby, as later described.

Before considering the piping for the incoming well stream and separation of gas, the specific structure within the first compartment 6 will be described. Vertical transverse partitions 17 and 18 are arranged in the compartment 6 in longitudinally spaced relation and cooperate with a horizontal wall 19 having laterally spaced downwardly curved side members 20 and 21 in forming a space 22 below the separator section 11 to receive the liquids evolved therein. The horizontal wall and side members 20 and 21 have ends connected to the inner edges of the partitions 17 and 18 whereby said horizontal wall is spaced downwardly from the top of the shell 3 and is above an oil-emulsion and water interface 23 maintained as later described. The side members are preferably spaced inwardly from the shell to define substantially uniform flowways 24 and 25 therebetween and said side members extend downwardly to slightly below the heat source and then inwardly thereunder terminating in spaced inner edges 26 defining an opening or passage 27 for oil and emulsion to move upwardly around the heat source. The partitions 17 and 18 terminate in lower edges 28 adjacent to and preferably slightly below the inner edges 26 of the members 20 and 21. The partitions 17 and 18, wall 19 and side members 20 and 21 cooperate with the shell 3 to form a receptacle space 22 below the separator section 11 with laterally spaced flowways 24 and 25 that extend on each side of the heat source and terminate therebelow. With this arrangement, well stream liquids in the receptacle space 22 flow outwardly toward the sides and ends thereof and then through the passages or flowways 24 and 25 for flow downwardly past the heater tube 15, the arrangement of the wall 19 and side members 20 and 21 serving as a spreader to obtain distribution of the liquids over a large area.

The compartment 6 is of large capacity to provide for sufficient residency of the liquids therein for stratification, with the upper portion of the upper stratus or the oil and emulsion moving to the second compartment 7 and free water collecting in the bottom of the compartment 6. The flow communication between the upper parts of the compartments 6 and 7 is provided by flow channels, preferably formed by spaced tubular members 29, that are mounted in the partitions 9 and 10 and extending through the upper portion of the compartment 8 with the ends opening into the compartments 6 and 7. It is preferred that the tubular members open into a spreader compartment 30 in the upper portion of the compartment 7. The compartment 30 is formed by a bottom wall 31 and end wall 32 with the wall 32 adjacent the end head 5. Sides of the wall 31 are connected to the shell 3 and a plurality of tubes 33 are spaced longitudinally and transversely and mounted in said wall with upper edges 33' slightly thereabove to form weirs over which the oil and emulsion can flow, thereby providing a spreading action to distribute the oil and emulsion over the area of the compartment 7, as later described. A drain duct 33" is arranged at the end of the compartment 30 and inclines therefrom for some flow adjacent the end head 5.

A water draw-off is provided and, in the illustrated structure, a water outlet conduit 34 extends into the shell 3 and has an inlet 35 adjacent the bottom of the compartment 6. Flow through the conduit 34 is regulated by a float valve 36 having connection 37 with a float ball 38 in the compartment 6 and responsive to the water level or interface 23. In the illustrated structure, the float ball is positioned between a baffle 39 and the partition 9 and spaced from the partition 18 so that the water and oil at the interface adjacent the location of the float ball is quiescent and not materially disturbed by upward flow of oil and emulsion by the heat source and then out of the open end of the divider structure or from between the side members 20 and 21 toward the baffle 39 and then upwardly to the tubular members 29. With this arrangement, there is a substantially continuous draw-off for the water to maintain the water level or interface 23 above the heat source and below the top edge 39' of the baffle as shown in FIG. 1. Any gas evolved in the compartment 6 between the partition 18 and partition 9 tending to collect in the upper portion is vented back into the separator 11 by means of a gas pressure equalizer line or passage 40 extending through the upper part of the partition 18 and then upwardly into said separator section 11.

In the illustrated structure, a well stream inlet conduit 41 extends into the separator section 11 preferably through the shell wall 12 near the head 13 and flow therefrom is turned by a baffle 42 whereby the well stream is directed substantially circumferentially within said section. A mist extractor 43 is located in the separator section and communicates with a gas outlet conduit 44 having an inlet opening at 45 with said conduit extending downwardly in the separator section 11 then through the partition 18 and out a side of the shell 3. The mist extractor has an outer member 46 in the form of an inverted cup shape having a top wall 47 and depending side wall 48. Mounted on the conduit 44 adjacent but below the opening 45 is a second inverted cup shape member 49 having a top wall 50 and a depending side wall 51 both spaced inwardly of the outer member 46. An inner tubular member 52 is spaced within the side wall 51 and has a lower portion mounted in a horizontal or bottom wall 53 which is connected to the wall 48. The tubular member 52 surrounds the upper portion of the conduit 44 and forms a passage open at its lower end for flow of gas and vapors upwardly into the cup shaped member 49, then downwardly between the wall 51 and the tubular member 52 to a space 54 between the wall 51 and the bottom wall 53, then upwardly inside the outer member 46 to the inlet opening 45. A condensate tube 55 is connected to the bottom wall 53 in communication with the interior of the mist extractor as at 56 and extends downwardly to adjacent the wall 19 with the discharge opening 57 below the level 58 of liquids in the space 22 for flow of condensate or liquids collecting in the mist extractor to the space 22. The separator section 11 preferably has a pressure relief valve 59 in the head wall 13 as in conventional practice. Also, there is a pressure gauge 60 connected to said separator section.

The well stream flows into the conduit 41, around the interior or chamber 61 in the separator section and generally downwardly to the receptacle space 22. The receptacle space 22, being above the heat source 15, causes some heat to be applied to the well stream and the discharge of the well stream into the large volume effects an initial gas separation with the gas rising and flowing through the interior of the tubular member 52 into the mist extractor 43. The condensate collects on the bottom wall 53 of the mist extractor 43 and flows downwardly through the drain tube 55 to the receptacle space 22 to be returned to the liquid phase or fractions of the well stream.

The liquids tend to collect in the space 22 and flow outwardly and downwardly through the passageways 24 and 25 around the heat source 15. Gas evolved during such downward flow may rise and collect in the shell 3 between the partitions 18 and 9 and then flow upwardly through the equalizer line 40 into the gas separator section. The heat from the heat source causes separation of free water from the oil and emulsion, which water quickly sinks to the bottom of the compartment 6. The oil and emulsion flows downwardly into the water, then under the lower edges 26 of the side members 20 and 21, then upwardly through the opening 27 past the heat source 15 and the baffle 39 for flow through the tubular members 29 to the compartment 7. Any gases evolved during the upflow of the oil and emulsion also moves through the equalizer line 40 back to the separator section 11.

It is desired to maintain the heated condition of the oil and emulsion for facilitating the resolving of the emulsion and separation of the water and oil therefrom and, to raise the temperature or maintain the temperature of the liquids in the compartment 7, heat is supplied in the compartment 7 by a heat source such as a fire tube 66. The fire tube 66 extends inwardly through a connection 67 in the end wall or head 5 and extends longitudinally in the compartment 7 to obtain the length for the large heat capacity required. The fire tube 66 is of conventional design, being fired with gas or oil and controlled from standard thermometer elements inserted into the heated liquids. The details of the control system and fuel supply for these tubes are not shown.

The liquids from the tubular members 29 flow over the wall 31 and through the tubes 33 for distribution and downward flow in the compartment 7 around the heat source or fire tube 66, further heating the liquids, whereby water tends to separate from the emulsion with the oil and emulsion in a stratus above a stratus of water. The downward flow in the compartment 7 is between the partition 10 and the end head 5. The partition 10 has a lower edge 63 spaced from the bottom of the shell to provide a flow passage 68' between the bottom portions of the compartments 7 and 8. A partition or wall 69' is vertically arranged between the partitions 9 and 10 preferably with greater spacing from the partition 10. A coalescing section 69 is arranged in the compartment 8 and extends between the partition 10 and the wall 69' and sides of the shell 3 and has a top and bottom defined by foraminous members such as perforated plates 70 and 71 respectively. A fibrous filter media such as excelsior, hay or the like 72 fills the space in the coalescing section whereby the heated emulsion may be finally treated by this agglomerating or coalescing section. The oil and emulsion flowing upwardly in the coalescing section results in the oil being coalesced and the water being coalesced within the section 69 with the clean oil produced passing through the perforated plate 70 above the coalescing section to collect in a body and overflow the upper edge 70' of the wall 69' into an oil draw-off area 71' between the partition 9 and wall 69' and the water coalesced gravitating downwardly to be removed as later described.

The lower parts of the compartments 7 and 8 being in communication through the passage 68' and the wall 69' terminating in a bottom edge 69" spaced from the shell for communication to the area 71' between the partition 9 and wall 69', a water draw-off 73 in said area 71' serves both. The water draw-off is through a conduit 74 that has an inlet 75 in the area 71' adjacent the bottom thereof. The draw-off of water through the conduit 74 is controlled by a float valve 76 having an operative connection 77 with a float, the ball 78 of which is arranged in the compartment 8 in the area 71' between the wall 69' and the partition 9 and in a position to be responsive to an interface 79 between a lower stratus of water and upper stratus of oil that moves over the wall edge 70'. The interface 79 preferably is adjacent to but below the bottom of the heat source or fire tube 66 and also is preferably at or slightly above the bottom perforated wall 71 of the coalescing section.

Movement of oil and emulsion from the upper stratus thereof in the compartment 7 to the coalescing section is effected by a tubular member 80 extending longitudinally in the vessel compartment 7 and having upstanding elongate inlet branch 81 which extends above the interface 79. A plurality of spaced apertures 80' in the bottom of the tubular member permits water to drain therefrom. The tubular member 80 extends through the partition 10 opening into the compartment 8 under the bottom wall 71 of the coalescing section 69. A distributor or spreader wall 82 is arranged under the bottom wall 71 of the coalescing section and above the opening of the tubular member 80. A plurality of tubes 83 are mounted in the wall 82 in longitudinal and transverse spaced relation with lower ends or inlets 83' of the tubes extending in spaced relation below the wall 82. It is preferred that the inlet of the tubes 83 adjacent the partition 10 be the lowest and that those toward the partition 9 be progressively higher so the oil tends to flow under the wall 82 to the wall 69'. In actual practice, the oil accumulates under the wall 82 and moves through all of the tubes 83 for substantially uniform distribution over the bottom of the coalescing section. This arrangement provides for the gravitation of oil and emulsion into inlet 84 of the branch 81 and then through the horizontal tubular member 80 into section 8 and up through the tubes 83 in the distributor under the coalescing section and then upwardly through the fibrous material therein, the coalesced water returning to the bottom of the compartment for draw through the water draw-off 73. Oil moving to the top of the coalescing section flows over the wall edge 70' to the area 71' and then through the inlet 85 of an oil outlet duct 86 for flow from the treating vessel.

Some gas may still remain in the oil as it passes through the coalescing section 69, said gas rising to the top of the compartment 8. Such gas may create a pressure on the level of oil collecting on top of the coalescing section, and the gas is vented from the compartment 8 by means of a valved vent 87 that extends through the partition 10. The venting is controlled by a float valve 88 having a float 89 responsive to the level of oil and emulsion in the compartment 30, the valve 88 being closed in response to a raising of the level of the oil and emulsion in the compartment 30. This equalization of pressure in the compartment is such that the oil and water levels in the compartments 7 and 8 maintain a quantity of oil over the top of the coalescing section and over the inlet 85 to the oil outlet closing same from escape of gas therethrough.

The water level or interface controls in the compartments 6 and 7 and the heat sources are such that the heat from the heating sources is principally in the oil and emulsion stratus for efficiently heating thereof and a minimum of lost heat through the collected free water. Flow is maintained through the horizontal vessel for treatment and flow whereby there is sufficient residency in the compartments for stratification of the oil and water. Also, the coalescing section is indirectly heated through the partitions 9 and 10 so that not only the liquids flowing through the vessel are being heated, the heat is maintained until completion of the treatment.

FIGS. 5 to 9 inclusive illustrate a modified form of treater generally designated 90 which consists of a horizontal vessel 91 having a shell or wall 92 with ends closed by heads 93 and 94 respectively. A vertical transverse partition 95 spaced from the end wall or head 93 cooperates with the shell to form a first compartment 96 therebetween. A second transverse partition 97 is arranged between the partition 95 and the end wall or head 94 and cooperates with said end head 94 to form a second compartment 98. The partitions 95 and 97 cooperate to define a third compartment 99 therebetween. In the illustrated structure, the partition 95 terminates in a lower edge 100 spaced above the bottom of the shell to form a communicating passage 101 between the compartment 96 and the compartment 99, said partition 95 extending to the sell in the remainder of its periphery. The partition 97 has a lower edge 102 spaced from the bottom of the shell to define a passage 103 providing communication between the compartments 98 and 99. The partition 97 is vertically extending with an upper edge 104 spaced from the top of the shell to form a communication space or passage between the upper portions of the compartments 98 and 99. Also, the upper edge 104 is above a foraminous or perforated top wall 106 of a coalescing section 107 between the partitions 95 and 97. The coalescing section also has a foraminous or perforated bottom wall 108 with a filter media or fibrous material such as hay, excelsior or the like 109 therebetween. A heat source in the form of a fire tube 110 extends into the compartment 96 from the end head 93. The fire tube extends longitudinally and is of a U or reverse bend type which suitable length in the compartment to furnish the large capacity of heat therefor. The fire tube or heat source is of conventional design, being fired with gas or oil and controlled from standard thermometer elements inserted into the heated liquids. The details of the control system and fuel supply for these tubes are not shown.

A separator section 111 extends upwardly from the shell above the compartment 96 and has a heat exchanger or condenser 112 and a mist extractor 113 in the separator section constructed and arranged as later described.

Also located in the compartment 96 between the firetube 110 and the top of the shell is a horizontal wall 114 extending from the partition 95 to a wall 115 to form a receptacle 116 that receives liquids from the separator. The horizontal wall 114 has a plurality of longitudinally and transversely spaced tubular members 117 extending downwardly therefrom and forming liquid flow passages from the receptacle 116 to the compartment 96, these tubular members being arranged with those near the longitudinal center having an open end extending slightly above the wall 114 and those adjacent the shell having an opening substantially at the wall 114 so the well liquid is in a level tending to flow laterally for distribution over a large area as it flows to the compartment 96. Drain tubes 117' incline from the receptacle 116 toward the end head 13 for some flow thereto in the wide area distribution.

A well stream conduit 119 controlled by a suitable valve 119' extends into the vessel preferably through the end head 94 into the compartment 98 and then upwardly and then longitudinally of the vessel through the upper part of the compartment 99 through the partition 95 to connect with the condenser 112 as at 120. The well stream moves through the condenser and is discharged therefrom through a flume or duct 121 to the receptacle 116. Gases evolved or separated from the liquids move back up in the separator, pass through the condenser and through the mist extractor and enter an inlet 122 of a gas outlet duct 123. Discharge of the gas is controlled by a float valve 124 actuated by a float ball 125 that is responsive to an oil level in the compartment 98, said valve closing in response to rise of oil level which indicates lower pressure in the treater. Condensate from the mist extractor passes through a drain tube 126 to the receptacle 116. There is a pressure equalization vent in the form of a pipe 127 that extends through the partition 95 adjacent the upper part thereof with one end open to the upper portion of the compartment 99 and the other end open in the separator section adjacent the upper end thereof alongside the mist extractor. In this structure, there is a vent communication in the form of a pipe 128 that extends through the wall 114 and opens therebelow into the compartment 96 with the other end opening in the separator section adjacent to and below the condenser for bleeding gas from the upper part of the chamber 96 as said gas is evolved from the liquids in said compartment.

The liquids from the receptacle 116 flow through the tubular members 117 and downwardly over the heat source 110 where the liquids are heated, the water tending to settle quickly to the bottom resulting in stratification whereby oil and emulsion are in one stratus above a stratus of water. Since the vessel is connected by communicating passages 101 and 103 between the compartments 96, 98 and 99, the water settling to the bottom in the compartment 96 may be drawn off by a water outlet at any selected portion at the bottom of the vessel. In the structure illustrated, a water outlet conduit 129 has an inlet 130 adjacent to the bottom of the compartment 98. Draw-off water through the conduit 129 is regulated by a float valve 131 having connection 132 to a float 133 in the compartment 98 and responsive to the level of the water therein or to the interface 134 between the water stratus at the bottom and the oil stratus thereabove in said compartment. This water level or interface 134 is near the same level or slightly above the bottom perforated plate 108 of the coalescing section 109.

Flow of oil and emulsion from the compartment 96 to the coalescing section is effected by means of a duct or passage member 135 that extends longitudinally of the compartment 96 through the partition 95 opening into the coalescing section in downwardly spaced relation to the perforated bottom wall 108. The passage member 135 has an upstanding elongate inclined inlet branch 136 having a top opening 137 adjacent to and below the heater source 110 but substantially above the interface 134 of the water and oil and emulsion strata. Oil and emulsion flow through the inlet openings 137 to the passage member and then longitudinally to under the coalescing section. The passage member 135 has a plurality of longitudinally spaced openings 139 in the bottom thereof so any water in the oil and emulsion flowing through said passage member can settle out and pass into the vessel at the bottom thereof. A distributor or spreader wall 138 having a plurality of tubes 138' extending therethrough is arranged in the compartment 99 above the passage member 135 and below the perforated bottom wall 108, the spreader being constructed and functioning as described relative to the spreader wall 82 and tubes therein in the form illustrated in FIGS. 1 to 4 inclusive. Oil and emulsion from the spreader 138 pass through the coalescing section coalescing the oil and coalescing the water, the coalesced water settling to the bottom passing through the perforated bottom member 108 and into the body of water maintained at the bottom of the vessel. The clean coalesced oil moves upwardly to form a body lying on the perforated top wall 106 and when it accumulates to a desired depth it flows over the weir 104 into the compartment 98 forming an oil stratus above the water level or interface 134. An oil outlet conduit 140 has an inlet 141 extending upwardly in the compartment 98 but below the level of the weir or edge 104 for flow of oil from the oil stratus in the compartment 98 thereby removing the clean oil from the vessel.

The gas pressure is substantially equalized in the compartments so that flow longitudinally of the vessel is effected substantially by gravity and when the accumulation of gas causes the oil level to recede in the compartment 98 the float 125 causes the valve 124 to open for discharge of the gas thereby restoring the treating vessel to the desired pressure. Also, any gas evolved above the clean oil in the coalescing section will pass through the pipe 127 to the separator section so it will pass through the condenser and mist extractor before being ejected from the vessel.

The heat exchanger or condenser 112 in the separator section consists of a tank-like structure 145 having a peripheral wall 146, a bottom wall 147 and a top wall 148. A horizontal partition 149 is connected to the peripheral wall 146 and spaced from the bottom wall 147 to define a chamber 150 therebetween and a chamber 151 between the partition 149 and the top wall 148. Inset from the peripheral wall 146 and upstanding from the top wall 148 is a peripheral wall 152 defining a chamber 153 closed at the top by an extractor top wall 154. A plurality of tubular members 155 form passages 156 communicating the chamber 150 with the chamber 153, said tubular members passing through the chamber 151. A plurality of other tubular members 157 extend through the partition 149 and top wall 148 to form flow passages 158 arranged exteriorly of the wall 152 providing communication from the separator interior to the chamber 150. The well stream is delivered to the chamber 151, flows around the tubular members 155 and 157 to the flume 121 on the opposite side of the chamber, said flume having an inlet 160 adjacent but below the wall 148 and discharging downwardly to the receptacle 116. Gas evolved in the treater moves up in the separator section and flows through the tubular members 157 to the chamber 150 then through the tubular members 155 in heat exchange relation with the well stream in the chamber 151, said gas passing into the chamber 153 around a horizontal baffle 161 and through a filter media 162 to the inlet 122 of the gas outlet duct 123. A condensate drain tube 126 is mounted in the bottom wall 147 to drain the condensate to the receptacle 116.

It is to be understood that while I have illustrated and described certain forms of my invention, it is not to be limited to the specific form or arrangement of parts herein described and shown except insofar as such limitations are included in the claims.

What I claim and desire to secure by Letters Patent is:

1. An oil well production treater including,
   (a) an elongated and horizontally extended shell,
   (b) a compartment within the shell adjacent one end thereof,
   (c) a heat source of large capacity mounted in said compartment,
   (d) means including a spreader communicating with said compartment for delivering and horizontally distributing oil and emulsion in an upper portion thereof for flow downwardly over said heat source whereby the heat thereof facilitates resolving of free water therefrom to settle to the bottom of said compartment forming a water level which is an interface of oil, emulsion and water,
   (e) a water outlet communicating with a point near the bottom of the shell and said compartment for removing water developed from said oil and emulsion,
   (f) means including a water level detector controlling removal of evolved and separated water from said shell,
   (g) a coalescing section at a level above said interface and having cooperating means for spreading oil and emulsion over the bottom area thereof,
   (h) a transverse partition in the shell separating said compartment from said coalescing section, said partition having al ower edge spaced from the bottom of the shell but below the interface for communication between said compartment and space below said spreader means,
   (i) said coalescing section being spaced from the other end of said shell,
   (j) tubular means in said compartment and having an upper inlet above said interface, said tubular means extending through said partition and having a discharge opening below said spreader means in the coalescing section for conducting oil and emulsion from adjacent said heating source longitudinally of the shell to the coalescing section for upward flow therein,
   (k) and an oil outlet having an inlet receiving oil overflowing from the upper portion of said coalescing section.

2. An oil well production treater as set forth in claim 1 including,
   (a) a gas outlet communicatng with the upper portion of said shell for discharge of gas evolved and separated from the oil and emulsion,
   (b) means including an oil level detector in a shell portion between said coalescing section and the other end of the shell permitting release of evolved and separated gas only when the oil level in said shell portion is below a predetermined level.

3. An oil well production treater including,
   (a) an elongated and horizontally extending shell,
   (b) a first compartment within the shell,
   (c) a heat source of large capacity mounted in said first compartment,
   (d) a liquid gas separator section on said shell in upwardly extending relation and having communication with said first compartment for flow of liquid thereto,
   (e) a heat exchanger in said separator section for passing well fluid in heat exchange relation to separated gas with an outlet for discharge of the well fluid to a lower part of the separator, said heat exchanger cooling said gas to condense liquid fractions thereof,
   (f) a gas outlet from said heat exchanger,
   (g) a condensate conduit between the heat exchanger and said first compartment,
   (h) means including a spreader for discharging and horizontally distributing liquids from the separator section to an upper portion of said first compartment to flow said liquids downwardly over the heat source to settle out free water forming an interface of oil, emulsion and water,
   (i) a water outlet communicating with a point near the bottom of the shell and said first compartment for removing water developed from said well fluid,
   (j) means including a water level detector controlling removal of evolved and separated water from said shell,
   (k) a coalescing section at a level above said interface, said coalescing section being adjacent said first compartment and spaced from the other end of the shell with a second compartment therebetween, a transverse partition in the shell separating said first compartment from the coalescing section, said partition having a lower edge spaced from the bottom of the shell for communication between the first compartment and space below the coalescing section,
   (l) tubular means in said first compartment and having an elongate upper inlet above said interface, said tubular means extending through said partition and having a discharge opening below said coalescing section for conducting oil and emulsion from adjacent said heat source to the coalescing section for upward flow therein,
   (m) said coalescing section having cooperating means for spreading said oil and emulsion over the bottom area thereof,
   (n) and an oil outlet communicating with said second compartment and having an inlet receiving oil overflowing from the upper portion of said coalescing section.

4. An oil well production treater as set forth in claim 3 which includes,
   (a) means including an oil level detector in said second compartment permitting release of gas through said gas outlet only when the oil level is below a predetermined height and above the inlet of the oil outlet.

5. An oil well production treater including,
   (a) an elongated and horizontally extending shell,
   (b) a first compartment within the shell adjacent one end thereof,
   (c) a heat source of large capacity mounted in said first compartment,
   (d) a liquid-gas separator section on said shell in upwardly extending relation and having communication with said first compartment for flow of liquid thereto,
   (e) a heat exchanger in said separator section and having a well fluid inlet and an outlet spaced from said inlet,
   (f) conduit means extending through said shell and into said separator section and connected to said heat exchange inlet for delivery of well fluid thereto,
   (g) means connected to said heat exchanger outlet for delivering said fluid from above a predetermined level therein to a lower part of said separator,
   (h) a mist extractor in said separator,
   (i) gas passages extending through said heat exchanger and having inlets for receiving gas evolved from the well fluid in the separator and outlets communicating with the mist extractor for delivering of gas thereto,
   (j) a gas outlet from said mist extractor,
   (k) a condensate conduit between the mist extractor and said first compartment,
   (l) means for discharging liquids from the separator section to said first compartment to flow said liquids downwardly over the heat source to settle out free water and form an interface of oil, emulsion and water,
   (m) a water outlet communicating with a point near the bottom of the shell and said first compartment for removing water developed from said well fluid,
   (n) means including a water level detector controlling removal of evolved and separated water from said shell,
   (o) a coalescing section at a level above said interface, said coalescing section being spaced from the other end of said shell, (p) means for conducting oil and emulsion downwardly from adjacent said heat source above said interface longitudinally of said shell to the coalescing section for upward flow therein, (q) said coalescing section having cooperating means for spreading said oil and emulsion over the bottom area thereof, (r) and an oil outlet having an inlet receiving oil overflowing from the upper portion of said coalescing section.

References Cited by the Examiner

UNITED STATES PATENTS

| | | | |
|---|---|---|---|
| Re. 19,666 | 8/1935 | McMurray | 55—166 |
| 2,726,729 | 12/1955 | Williams | 55—174 |
| 2,874,798 | 2/1959 | Walker | 55—202 |
| 3,009,536 | 11/1961 | Glasgow | 55—45 |
| 3,202,167 | 8/1965 | Young et al. | 55—166 |
| 3,255,574 | 6/1966 | Glasgow | 55—42 |

REUBEN FRIEDMAN, *Primary Examiner.*

C. HART, *Assistant Examiner.*